March 6, 1956  D. A. THOMAS  2,737,063
DIFFERENTIAL GEARING FOR VEHICLES
Filed March 5, 1954
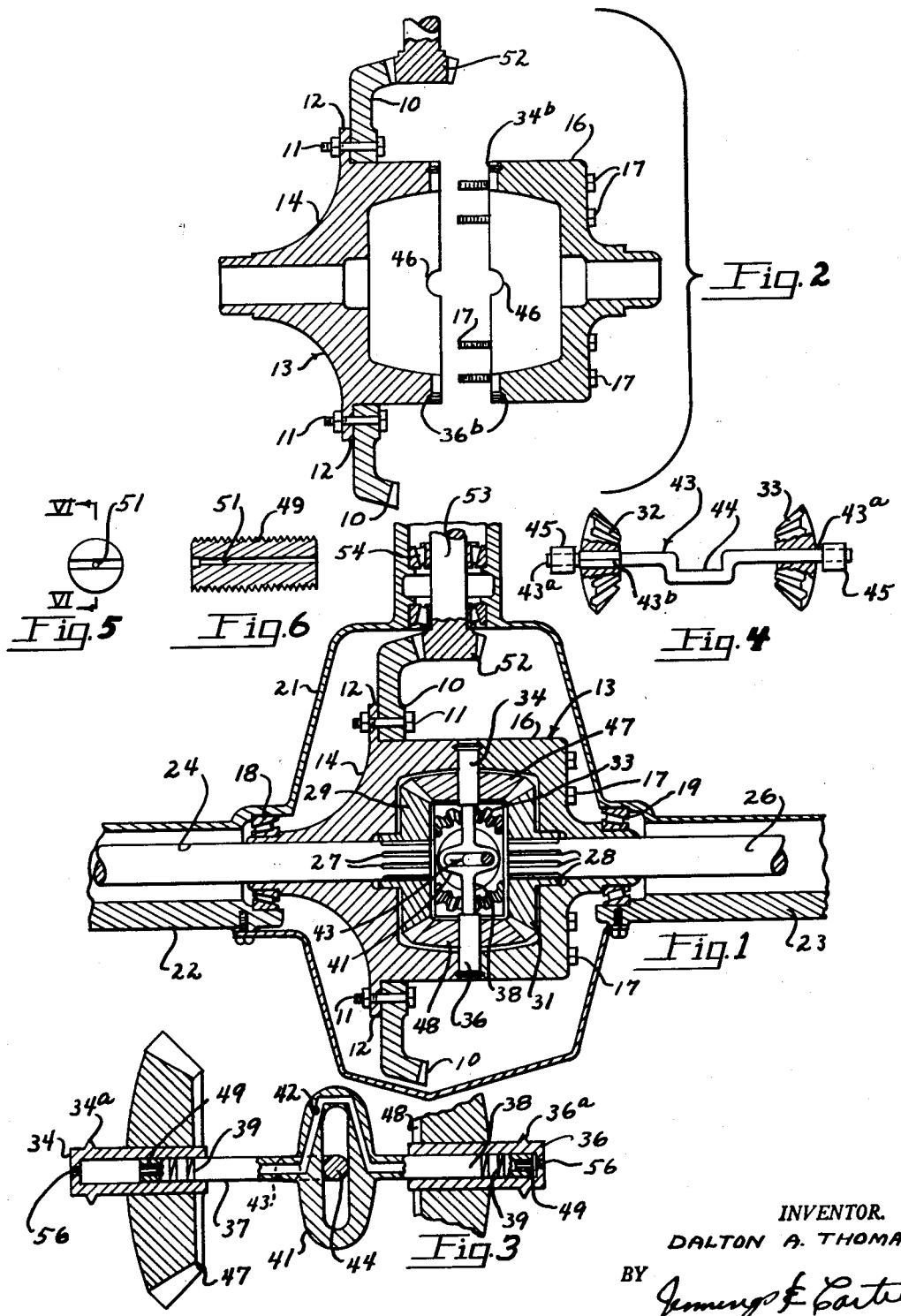
INVENTOR.
DALTON A. THOMAS
BY
Jennings & Carter
ATTORNEYS

United States Patent Office 2,737,063
Patented Mar. 6, 1956

2,737,063

DIFFERENTIAL GEARING FOR VEHICLES

Dalton A. Thomas, Sylacauga, Ala.

Application March 5, 1954, Serial No. 414,311

5 Claims. (Cl. 74—711)

My invention relates to differential gearing for vehicles.

In automobiles and similar vehicles the rear wheels are driven through the usual differential gearing embodying the ring gear, a rotating differential case on which the ring gear is mounted and into which project the inner ends of the axles. There are gears, called axle or side gears, fast on the inner ends of each axle in mesh with differential pinions mounted on bearings in the case. The whole mechanism is enclosed by the usual differential housing and axle tubes.

As is well understood, the primary function of differential gearing for driving vehicles is to permit differential speeds in the wheels to compensate for differences in travel thereof when turning curves. Mechanism permitting this has the inherent undesirable characteristic of permitting all the power to be absorbed by one wheel without rotating the other wheel. Thus, if one driven wheel runs onto a slick spot in the roadway or, if one wheel be momentarily off the ground, it immediately commences to spin while the other wheel receives no power. As a propelling drive means, under these circumstances, differential gearing as presently used on motor vehicle causes excessive tire wear, skidding of the vehicle, and otherwise is unsatisfactory in operation.

In view of the foregoing an object of my invention is to provide differential gearing in which there is at least one fluid cylinder mounted on the differential case and having a piston therein, there being a supply of fluid in the cylinder against which the piston works when it reciprocates, driven by means on the differential case to reciprocate in the cylinder whenever one axle rotates at a speed different from the other, whereby the power put into the differential gearing is transmitted substantially equally to both axles at all times.

More specifically, my invention contemplates a pair of opposed cylinders mounted on the side walls of the differential case, facing inwardly, a piston in each of the cylinders connected by a slotted yoke member, there being a restricted fluid passage leading from each piston to the other and opening through the ends of the pistons, together with a crank shaft fast on one of the differential pinions with its throw passing through the yoke, whereby upon rotation of the differential pinions the pistons move, tending to retard rotation of the differential pinions, thereby driving both axles substantially at all times.

My invention contemplates fluid pressure means which shall be effective, upon difference in rotation of the two axles, to retard this differential action by retarding the rotation of the differential pinions which are commonly employed in differential gearing so that the power put into the differential gearing is delivered substantially equally to both axles under all conditions of operation.

A further object of my invention is to provide apparatus of the character designated in which the entire fluid equalizing mechanism is carried by the differential case, completely enclosed within the differential housing, and to provide mechanism which may readily be installed without major change in any part of the differential gearing, its bearings, housing, or the like.

Apparatus illustrating the features of my invention is shown in the accompanying drawings forming a part of this application in which:

Fig. 1 is a sectional view through a typical vehicle differential gearing arrangement and showing my invention applied thereto;

Fig. 2 is a partially exploded sectional view showing the differential case, ring gear and drive pinion;

Fig. 3 is a detail sectional view with some parts broken away and showing the cylinders, pistons, yoke and crank shaft which I employ in my improved apparatus;

Fig. 4 is a side elevational view, partly in section, of the crank shaft and differential pinions removed from the rest of the apparatus;

Fig. 5 is an end view of one of the restricted orifice plugs for insertion in the ends of the pistons; and, Fig. 6 is a detail sectional view of the orifice plug taken along line VI—VI of Fig. 5.

Referring now to the drawings for a better understanding of my invention I show the same in association with a more or less conventional form of differential gearing for an automobile. As will be understood from Fig. 1, the differential gearing embodies the ring gear 10 which may be mounted by means of bolts 11 or the like to a flange 12 of a split differential case indicated generally by the numeral 13. The case 13 may embody the separate halves 14 and 16 and these halves may be held together by means of bolts 17 in the manner well understood.

The differential case 13 may be mounted on anti-friction bearings 18 and 19 within the differential housing 21. The housing 21 may connect as indicated to axle tubes 22 and 23. Within the tubes are axles 24 and 26, respectively. The axles have end splines 27 and 28 thereon for receiving non-rotatably the side gears 29 and 31, respectively. The ground engaging driving wheels, not shown, are carried in the usual manner on the outer ends of the axles 24 and 26.

Gears 29 and 31 are in mesh with differential pinions 32 and 33. The pinions 32 and 33 normally, without the addition of my invention, are supported on a shaft that runs through the case, the shaft being secured in suitable openings in the case 13.

My invention consists in providing in the differential case closed end cylinders 34 and 36. The cylinders may have V-shaped rings 34a and 36a extending thereabout which are disposed to fit in V-shaped seats 34b and 36b in the matching sides of the halves 14 and 16. Therefore, when the bolts 17 are drawn up the cylinders are clamped securely between the halves of the differential case 13.

Disposed to fit slidably in the cylinders 34 and 36 are pistons 37 and 38. The pistons may carry the usual sealing rings 39 in order to maintain a fluid tight fit in the respective cylinders.

The pistons are extended inwardly and connect rigidly to a centrally disposed yoke member 41. Also, there is a fluid passage 42 extending from end to end of each piston so that fluid in either cylinder is free to flow through the passage 42 to the other cylinder as will presently appear when the pistons move axially in the cylinders.

Keyed to one of the differential pinions 32 or 33, for instance the pinion 32, is a crank shaft 43 having throw 44. The pinion 32 may be mounted non-rotatably on the associated end of the crank shaft by providing a square section 43b on the crank shaft on which the pinion fits. The other pinion 33 rotates freely on the crank shaft. The ends 43a of the crank shaft 43 may be journalled in bushings 45 clamped in matching openings 46 in the halves 14 and 16 of the case 13.

If desired idler gears 47 and 48 may be rotatably journalled on the cylinders 34 and 36 to take a part of the thrust load of the differential gearing in the manner well understood.

In order to regulate the flow of fluid through passage 42 as presently will appear, I may tap and thread the ends of the pistons 37 and 38 to receive bushings 49. The bushings 49 may have small orifices 51 therethrough, thus to throttle the flow of fluid through the passage 42.

In the manner also well understood the ring gear is driven by a driving pinion 52 fast on a drive shaft 53. The drive shaft may be supported in suitable bearings 54.

From the foregoing the method of constructing and using my improved differential gearing and the several advantages thereof may now be explained and understood. It will be apparent that so long as the pinions 32 and 33 remain stationary, motion imparted to the ring gear 10 drives the axles 24 and 26 at precisely the same rate of speed and in the same direction. However, should one of the wheels, not shown, mounted on the axles 24 or 26 run upon a slick place in the road with power being applied to the differential gearing, the pinions 32 and 33 immediately commence to rotate since, without rotation of the same there can be no differential between the speed of the axles 24 and 26. Under these conditions the crank shaft 43 commences to rotate, moving the yoke and reciprocating the pistons. With the cylinders and the fluid passage 42 completely filled with a suitable fluid such for instance as the usual brake-fluid or the like, it will be seen that before the gears 32 and 33 can rotate, the oil in the cylinder into which the piston is moving must flow through the adjacent metering orifice 51, through the passage 42 and into the opposite cylinder. For instance, as viewed in Fig. 3, if at the time the pinions 32 and 33 commence to rotate the parts are in the position shown in Fig. 3, fluid would travel from the cylinder 34 through the associated orifice 51, through the passage 42, through the other orifice 51 and into the cylinder 36. This would have the effect of retarding the rotation of the pinions 32 and 33 and hence would cause the power from the drive shaft 53 to be imparted substantially uniformly to the two axles, rotating both ground engaging wheels. It will be apparent that the amount of slippage or, in other words, the amount of differential action in the mechanism shown can be regulated by varying the size of the orifices 51.

In order to provide ready means for filling the cylinders 34 and 36 and for bleeding air from the same I may provide each with a screw plug 56 in the end thereof.

From the foregoing it will be apparent that I have devised an improved hydraulic mechanism for obtaining an improved driving action from the usual differential gearing. It will be seen that the cylinders 34 and 36 may simply be clamped between the halves of the usual differential case and that this forms a simple, effective and efficient means for mounting the same. Furthermore, my improved mechanism is entirely enclosed within the differential housing. The same embodies relatively few working parts and no major changes are required in the design of present differential gearing in order to accommodate my invention thereto.

As stated, the amount of differential drive desired such as the relatively small amount required to permit the vehicle to turn curves, may be determined by the size of the ports 51 in the plugs 49. I thus provide a fluid flow means for opposing reciprocation of the pistons and thus for regulating the differential action of the mechanism which embodies no moving parts whatsoever. Once the size of the openings 51 is determined there should be no necessity of setting the same again. It will be further apparent that the cylinders and the passage 42 can be filled with fluids suitable for the purpose at hand and which are of relatively constant fluidity through considerable ranges of temperature. The use of such fluids assures a constant amount of differential action in the mechanism throughout the range of ordinary operating temperatures.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with differential gearing embodying axle gears driven through differential pinions mounted on a differential case, of a pair of fluid pressure cylinders mounted in axial alignment in opposite sides of the differential case, pistons in the cylinders projecting inwardly of the case and connected by a centrally disposed yoke-like section, a cross connected restricted fluid passage extending from end to end of the pistons and opening into the cylinders, and a crank connected to one of the differential pinions and operable to reciprocate the pistons concomitantly upon rotation of the differential pinions.

2. The combination with differential gearing embodying axle gears driven through differential pinions mounted on a differential case, of a pair of axially aligned fluid pressure cylinders mounted in spaced relation to each other in the differential case, pistons in the cylinders projecting inwardly of the case and connected by a centrally disposed yoke-like section, a restricted fluid passage extending from end to end of the pistons and through the yoke-like section opening into and affording communication between the cylinders, a crank connected to one of the differential pinions and operable to reciprocate the pistons concomitantly upon rotation of the differential pinions, and a quantity of substantially non-compressible fluid substantially completely filling the cylinders and the fluid passage.

3. The combination with a split differential case into which project axles carrying gears together with differential pinions carried by the case, of a pair of inwardly opening axially aligned fluid cylinders rigidly clamped between the halves of the case at opposite sides thereof, connected pistons in the cylinders, a restricted fluid passage extending completely through the pistons affording communication between the cylinders, a crank shaft journaled in the case, means mounting one of the differential pinions fast on the crank shaft thereby to rotate the crank shaft upon relative rotation between the axle gears, means operatively connecting said crank shaft to said pistons whereby upon rotation of said differential pinions the pistons are reciprocated simultaneously, and a supply of fluid substantially filling the cylinders and said passage.

4. Apparatus as defined in claim 3 in which a differential pinion opposite the pinion fast on the crank shaft is rotatably mounted upon the crank shaft.

5. Apparatus as defined in claim 3 in which thrust gears are rotatably mounted upon the cylinders and mesh with the axle gears.

References Cited in the file of this patent

UNITED STATES PATENTS

| 1,178,093 | Moon | Apr. 4, 1916 |
| 1,479,752 | Smith | Jan. 1, 1924 |
| 1,916,715 | Corey | July 4, 1933 |
| 2,375,938 | Moon | May 15, 1945 |
| 2,650,507 | Clinteman | Sept. 1, 1953 |